US010003425B2

(12) United States Patent
Abbott

(10) Patent No.: US 10,003,425 B2
(45) Date of Patent: Jun. 19, 2018

(54) BRANCHING CONFIGURATION INCLUDING SEPARATE BRANCHING UNIT AND PREDETERMINED WAVELENGTH FILTER UNIT AND SYSTEM AND METHOD INCLUDING THE SAME

(75) Inventor: Stuart M. Abbott, Marlboro, NJ (US)

(73) Assignee: TYCO ELECTRONICS SUBSEA COMMUNICATIONS LLC, Eatontown, NJ (US)

( * ) Notice: Subject to any disclaimer, the term of this patent is extended or adjusted under 35 U.S.C. 154(b) by 262 days.

(21) Appl. No.: 12/779,409

(22) Filed: May 13, 2010

(65) Prior Publication Data
US 2010/0290786 A1 Nov. 18, 2010

Related U.S. Application Data

(60) Provisional application No. 61/178,451, filed on May 14, 2009.

(51) Int. Cl.
*H04J 14/02* (2006.01)
(52) U.S. Cl.
CPC ........ *H04J 14/0204* (2013.01); *H04J 14/021* (2013.01); *H04J 14/0205* (2013.01); *H04J 14/0206* (2013.01); *H04J 14/0213* (2013.01); *H04J 14/0217* (2013.01); *H04J 14/0221* (2013.01)
(58) Field of Classification Search
CPC ............... H04J 14/0204; H04J 14/0205; H04J 14/0206; H04J 14/021; H04J 14/0213; H04J 14/0217; H04J 14/0221
USPC ............................... 398/81, 82–87, 104, 105
See application file for complete search history.

(56) References Cited

U.S. PATENT DOCUMENTS

| 5,526,157 | A | * | 6/1996 | Kawano | 398/1 |
| 5,631,758 | A | | 5/1997 | Knox et al. | |
| 5,717,795 | A | * | 2/1998 | Sharma | H04B 10/506 385/16 |
| 5,838,477 | A | | 11/1998 | Yamamoto et al. | |
| 6,115,516 | A | | 9/2000 | Watson et al. | |
| 6,208,441 | B1 | * | 3/2001 | Jones | H04J 14/0201 385/24 |

(Continued)

FOREIGN PATENT DOCUMENTS

| EP | 0842574 | 4/2002 |
| EP | 668674 | 5/2003 |

OTHER PUBLICATIONS

International Search Report and Written Opinion dated Jul. 15, 2010 issued in related International Patent Application No. PCT/US2010/034698.

(Continued)

*Primary Examiner* — Amritbir Sandhu

(57) ABSTRACT

In general, a branching configuration used in a wavelength division multiplexed (WDM) optical communication system includes a branching unit (BU) and a separate predetermined wavelength filter (PWF) unit. The PWF unit may include wavelength selective elements (e.g., filters) for providing a desired wavelength allocation and may also include optical connections (e.g. optical couplers) for coupling the allocated wavelengths between trunk and branch paths in the WDM system. The PWF unit is physically separate from an associated BU but coupled adjacent the BU.

13 Claims, 6 Drawing Sheets

(56) References Cited

U.S. PATENT DOCUMENTS

| | | | | |
|---|---|---|---|---|
| 6,211,980 B1* | 4/2001 | Terahara | ............ | H04J 14/0209 385/16 |
| 6,351,323 B1* | 2/2002 | Onaka | ................ | H04J 14/0204 359/308 |
| 6,452,701 B1* | 9/2002 | Terahara et al. | ................ | 398/30 |
| 6,486,989 B2 | 11/2002 | Shinoda | | |
| 6,665,477 B2* | 12/2003 | Toth | ..................... | G02B 6/3816 385/100 |
| 6,721,507 B2* | 4/2004 | Iwata | ................. | H04J 14/0221 385/140 |
| 6,823,138 B2* | 11/2004 | Shinoda | ................. | H04J 14/02 398/14 |
| 6,829,438 B2* | 12/2004 | Liu | ..................... | H04J 14/0206 385/24 |
| 6,885,825 B2* | 4/2005 | DeGrange, Jr. | ...... | H04B 10/296 398/83 |
| 6,895,187 B1* | 5/2005 | Webb | ................ | H04Q 11/0005 307/126 |
| 7,085,456 B1* | 8/2006 | Nagel | ................ | G02B 6/4441 385/100 |
| 7,426,323 B2* | 9/2008 | Abbott | ............. | H04B 10/25253 385/123 |
| 7,433,601 B2 | 10/2008 | Kai | | |
| 7,571,140 B2* | 8/2009 | Weichert | .............. | G06Q 20/102 705/40 |
| 7,813,642 B2* | 10/2010 | Muro et al. | ...................... | 398/95 |
| 8,290,361 B2* | 10/2012 | Nakano | ............... | H04B 10/077 398/10 |
| 9,276,694 B2* | 3/2016 | Wang | ................ | H04J 14/0201 |
| 2002/0057177 A1* | 5/2002 | Forss | .................... | H01F 27/323 336/206 |
| 2002/0057477 A1* | 5/2002 | Rocca et al. | .................. | 359/141 |
| 2002/0063921 A1* | 5/2002 | Terahara | ............. | H04B 10/035 398/30 |
| 2002/0067524 A1* | 6/2002 | Shinoda | ............. | H04B 10/2507 398/38 |
| 2002/0105695 A1* | 8/2002 | DeGrange, Jr. | ...... | H04B 10/296 398/97 |
| 2002/0191249 A1* | 12/2002 | Orbach | ............... | H04J 14/0206 398/85 |
| 2003/0048509 A1 | 3/2003 | Shinoda | | |
| 2004/0151502 A1* | 8/2004 | Kerfoot, III | ......... | H04B 10/296 398/82 |
| 2004/0175187 A1* | 9/2004 | Eiselt | ................. | H04B 10/2971 398/173 |
| 2005/0084207 A1* | 4/2005 | Nagel | ................. | H04J 14/0201 385/24 |
| 2005/0213980 A1* | 9/2005 | Ota | .................... | H04B 10/2918 398/84 |
| 2006/0133822 A1* | 6/2006 | Manna et al. | ................. | 398/173 |
| 2006/0239684 A1* | 10/2006 | Oguma | ............... | H04J 14/0204 398/83 |
| 2007/0143822 A1* | 6/2007 | Hoda | ...................... | H04H 60/97 725/151 |
| 2009/0028566 A1* | 1/2009 | Abbott | ................. | H04B 10/038 398/83 |
| 2009/0297154 A1* | 12/2009 | Izumi | ................... | G01M 11/332 398/81 |
| 2010/0008672 A1* | 1/2010 | Kovsh | ................ | H04J 14/0204 398/85 |
| 2010/0028003 A1* | 2/2010 | Nakamura | ....... | H04B 10/07955 398/79 |
| 2010/0290786 A1* | 11/2010 | Abbott | ................ | H04J 14/0204 398/79 |
| 2011/0026925 A1* | 2/2011 | Mu | ................... | H04L 12/40013 398/79 |
| 2011/0076017 A1* | 3/2011 | Midorikawa | ....... | H04J 14/0201 398/48 |
| 2011/0135310 A1* | 6/2011 | Kovsh | ................ | H04J 14/0221 398/83 |
| 2011/0200322 A1* | 8/2011 | Kovsh | ................ | H04J 14/0209 398/2 |
| 2011/0311216 A1* | 12/2011 | Inoue | ................. | H04B 10/0791 398/1 |
| 2012/0177362 A1* | 7/2012 | Zhang | ............... | H04B 10/0773 398/9 |
| 2015/0043920 A1* | 2/2015 | Ji | ......................... | H04J 14/021 398/83 |
| 2015/0093116 A1* | 4/2015 | Wang | ................. | H04Q 11/0005 398/104 |
| 2015/0200742 A1* | 7/2015 | Kamalov | ............. | H04J 14/021 398/85 |
| 2015/0200743 A1* | 7/2015 | Kamalov | ............ | H04J 14/0202 398/85 |
| 2015/0295674 A1* | 10/2015 | Inoue | ................. | H04B 10/03 398/83 |
| 2016/0308638 A1* | 10/2016 | Zhang | ................. | H04J 14/0205 |

OTHER PUBLICATIONS

Japanese Office Action dated Nov. 21, 2013 in corresponding Japanese Application Serial No. 2012-511008.

\* cited by examiner

BRANCHING CONFIGURATION INCLUDING SEPARATE BRANCHING UNIT AND PREDETERMINED WAVELENGTH FILTER UNIT AND SYSTEM AND METHOD INCLUDING THE SAME

CROSS-REFERENCE TO RELATED APPLICATIONS

This application claims the benefit of U.S. Provisional Patent Application Ser. No. 61/178,451, filed May 14, 2009, which is fully incorporated herein by reference.

TECHNICAL FIELD

The present disclosure relates to optical communication systems, and in particular, to a branching configuration including a branching unit and a separate predetermined wavelength filter unit and system and method including the same.

BACKGROUND

To maximize the transmission capacity of an optical communication system, a single optical fiber may be used to carry multiple optical signals in what is called a wavelength division multiplexed system (hereinafter a WDM system). The multiple optical signals may be multiplexed to form an aggregate multiplexed signal or WDM signal with each of the multiple signals being modulated on separate wavelengths referred to as channels. Modern WDM systems have a high traffic capacity, for example, a capacity to carry 96 or more channels at 10 gigabits per second (hereinafter Gb/s) or more.

The optical transmission system may include a relatively long trunk path (e.g., optical fiber) that may be terminated at a transmitting and/or receiving trunk terminal. The optical transmission system may further include one or more branching units situated along its trunk path. Each branching unit (BU) may be connected to a branch path (e.g., optical fiber) that terminates in a transmitting and/or receiving branch terminal. Each BU may include one or more integral optical add/drop multiplexers (OADM). Channels or wavelengths may be added to and/or dropped from the trunk path of the optical transmission system via the OADMs to direct optical signals on selected channels from and to the branch terminals.

In systems incorporating a BU with integrated OADM functionality, the wavelength allocation, i.e. the wavelengths to be added, dropped and/or passed through the OADM, must be determined before construction and deployment of the BU. This can increase system cost and reduce the system design flexibility. Customizing the BUs for desired wavelength allocations in each branch segment can be time consuming and cumbersome. In addition, wavelength allocation requirements can change just prior to system deployment and/or after system deployment. In an undersea system, these changes can delay undersea deployment of the BUs and/or require retrieval of the undersea BUs to make the desired changes.

BRIEF DESCRIPTION OF THE DRAWINGS

Reference should be made to the following detailed description which should be read in conjunction with the following figures, wherein like numerals represent like parts.

DETAILED DESCRIPTION

In general, a branching configuration used in a wavelength division multiplexed (WDM) optical communication system, consistent with the present disclosure, includes a branching unit (BU) and a separate predetermined wavelength filter (PWF) unit. The PWF unit may include wavelength selective elements (e.g., filters) for providing a desired wavelength allocation and may also include optical connections (e.g. optical couplers) for coupling the allocated wavelengths between trunk and branch paths in the WDM system. The PWF unit is physically separate from an associated BU but coupled adjacent the BU. In one embodiment, the PWF unit may be located between about 30-200 m from the BU so that, once deployed in an undersea environment, the BU and PWF unit may be retrieved together for repair or replacement operations. In another embodiment, the PWF unit may be positioned a sufficient number of water depths, e.g. two or more water depths, away from the BU so that the PWF unit may be retrieved independently from the BU for repair or replacement.

Figure 1:
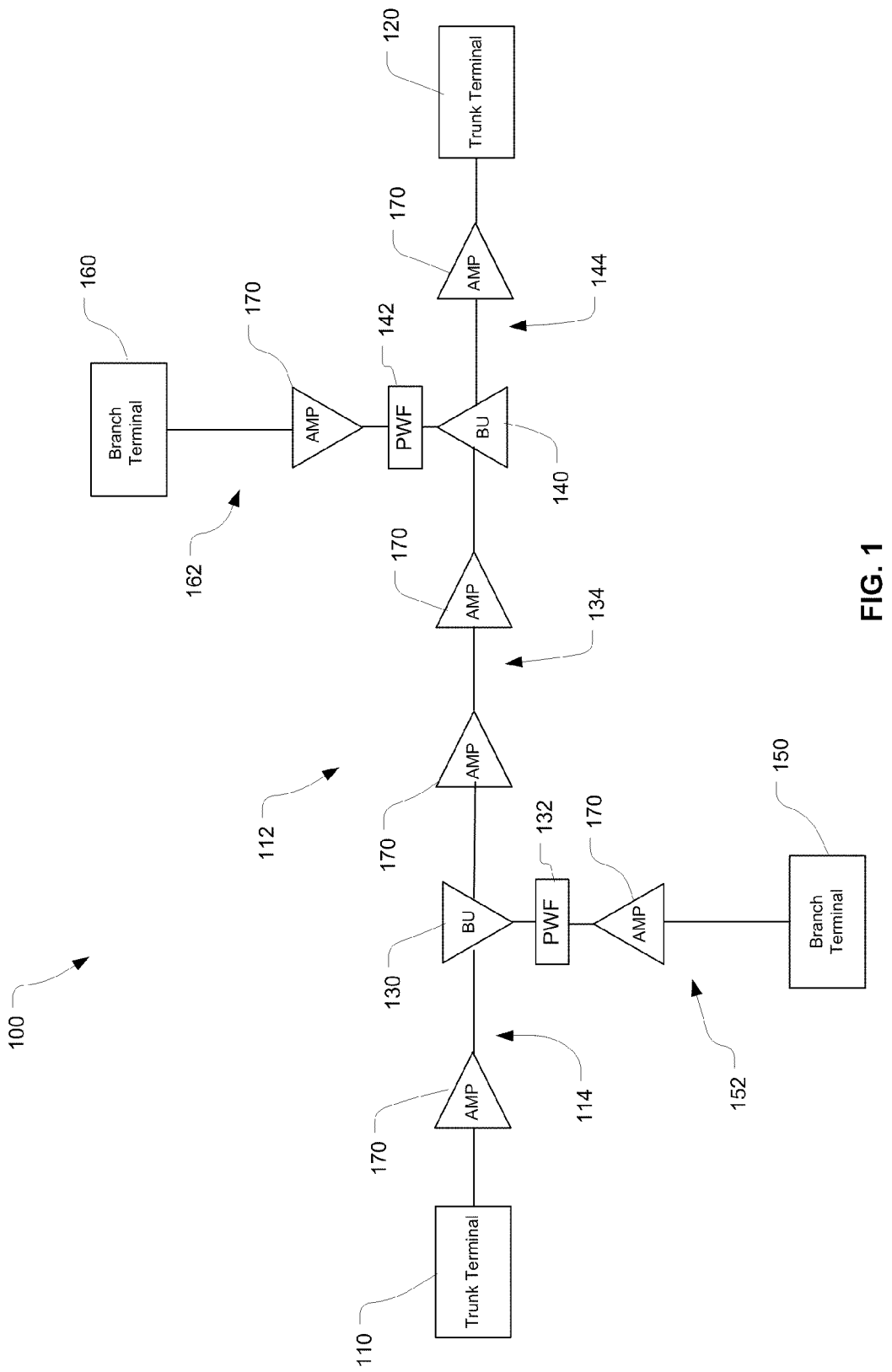
FIG. 1 is a schematic illustration of an optical communication system consistent with the present disclosure.

Turning now to FIG. 1, there is illustrated an exemplary WDM optical communication system 100 consistent with the present disclosure. Those skilled in the art will recognize that the system 100 has been depicted in highly simplified form for ease of explanation. The optical communication system 100 includes trunk terminals 110, 120 coupled to a trunk path 112. The term "coupled" as used herein refers to any connection, coupling, link or the like by which signals carried by one system element are imparted to the "coupled" element. Such "coupled" devices are not necessarily directly connected to one another and may be separated by intermediate components or devices that may manipulate or modify such signals.

The trunk path 112 may include optical fiber in a plurality of optical cable segments, e.g. cable segments 114, 134, 144, for carrying optical signals. Each cable segment may include one or more sections of optical fiber cable including optical fiber pairs and one or more repeaters 170 to provide a transmission path for bi-directional communication of optical signals between trunk terminal 110 and trunk terminal 120.

One or more branching units, e.g., branching units 130, 140, may be coupled to the trunk path 112 between the trunk terminals 110, 120, and one or more associated PWF units, e.g., PWF units 132, 142, may be coupled to, but physically separated from, the branching units 130, 140. Each PWF unit 132, 142 may be further coupled to a branch terminal, e.g., branch terminals 150, 160, respectively, through an associated branch path 152, 162, respectively. The branching units 130, 140 and respective PWF units 132, 142 together form branching configurations that direct optical signals to and from the branch paths 152, 162 and branch terminals 150, 160 by dropping and adding the allocated channel wavelengths, as will be described in greater detail below.

The branch paths 152, 162 may also include optical fiber in optical cable segments to provide a transmission path for bi-directional communication of optical signals. The system 100 may therefore be configured to provide bi-directional communication of optical signals between any of the terminals 110, 120, 150, 160. For ease of explanation, the description herein may refer to transmission from one terminal to another. It is to be understood, however, that the system 100 may be configured for bi-directional or uni-directional communication between any number of the terminals 110, 120, 150, 160. Similar to the trunk path 112, the branch paths 152, 162 may further include one or more repeaters 170.

The components in the trunk and branch paths may include various configurations for achieving their intended functionality. The repeaters 170, for example, may include any optical amplifier/repeater configuration that compensates for signal attenuation on the transmission path. For example, one or more of the repeaters may be configured as an optical amplifier, such as an erbium doped fiber amplifier (EDFA), a Raman amplifier, or a hybrid Raman/EDFA amplifier. Also, one or more of the repeaters may be provided in an optical-electrical-optical configuration that regenerates an optical signal by converting it to an electrical signal, processing the electrical signal and then retransmitting the optical signal.

System 100 may be configured as a long-haul system, e.g. having a length between at least two of the terminals of more than about 600 km, which spans a body of water, e.g. an ocean. The branching units 130, 140 and the PWF units 132, 142 may be seated on the ocean floor in an undersea environment. The trunk path 112 may thus span between beach landings.

The PWF units 132, 142 are not physically located in the BUs 130, 140 or in the branch terminals 150, 160. Instead, the PWF units are physically separate from the BUs and branch terminals and located adjacent or proximate to the BUs. The physical separation may facilitate changing the wavelength allocation in the branching configuration by allowing the PWF unit to be replaced or modified without replacing or modifying the BU. As described above, the PWF units may be located within about 30-200 m from their associated BUs to allow retrieval of both the BU and PWF unit. Alternatively, the PWF unit may be located a sufficient number of water depths (e.g. two or more water depths) from its associated BU to allow retrieval of the PWF unit by a ship operation without retrieving the BU. In one embodiment, for example, the PWF unit may be located about 10-15 km from its associated BU. In general, the PWF unit may be located between 30 m and 50 km from its associated BU.

Deploying the PWF units adjacent the BUs not only allows retrieval of the PWF unit with or separately from the BU, depending on the distance from the BU, but also provides a relatively small (compared to the distance between the BU and the branch terminal) cable length that could possibly be damaged by external forces, thereby providing a low possibility of trunk traffic being interrupted by cable damage. The risk of cable damage affecting trunk traffic extends only to the distance between the BU and its associated PWF unit, as opposed, for example, to the entire length of the branch path in a configuration wherein the wavelength selective elements are provided in a branch terminal. In addition, placing the PWF unit adjacent the BU and not in the branch terminal provides a security feature because trunk traffic that is not allocated to the branch path may be blocked from the branch terminal by the PWF unit, as opposed to being coupled to the branch path and directed to a branch terminal.

In general, a WDM signal may originate at one or more of the terminals and may include a plurality of multiplexed optical signals modulated on a plurality of different channel wavelengths. One or more channels may be allocated as express channels configured to travel uninterrupted through the trunk path 112 from an originating trunk terminal through the BUs and PWFs and to a receiving trunk terminal. One or more other channels may be local channels that are added and dropped by the PWFs to/from the branch terminals.

For example, a signal that originates at trunk terminal 110 may include one or more information signals occupying one or more channels (e.g., express channels and local channels). Likewise, a signal that originates at branch terminal 150 may also include one or more information signals occupying one or more channels (e.g., local channels). Both the trunk and branch signals may be transmitted to PWF unit 132, e.g. through the branching unit 130 in the case of the signals originating from the trunk terminal. Channels carrying information signals may also be referred to as utilized channels. The trunk and branch signals may also include loading signals on channels without information signals, referred to as unutilized channels, to maintain uniform channel loading. A loading signal may include a non-information carrying signal such as broadband noise, e.g. ASE noise, ASE noise band or a dummy tone. Dummy tones generally refer to optical energy that is centered on a specific wavelength and that does not carry information or traffic.

Any express channels may be passed from the originating trunk terminal to the trunk path directly through the BU or PWF unit without interruption. One or more local channels may be dropped from the trunk path or added to the trunk path at the PWF units. PWF unit 132 may be configured to drop, i.e. extract, one or more local channel wavelengths carrying information signals originating from the trunk terminal 110. The information signals on the dropped local channels may then be passed to the branch terminal 150. PWF unit 132 may also be configured to add, i.e. insert, one or more local channel wavelengths carrying information signals originating from the branch terminal 150 to the trunk path 112. The resulting WDM optical signal, i.e. including the added information signals, may then be passed onto the trunk path 112 (e.g., onto segment 134 following the BU 130). The resulting WDM optical signal may be received by PWF unit 142, e.g. through branching unit 140, and the PWF unit 142 may similarly add and/or drop one or more local channels carrying information signals. The local channels carrying information signals that originate at other terminals may be similarly added and/or dropped at PWF unit 142 and/or PWF unit 132.

Figure 2:
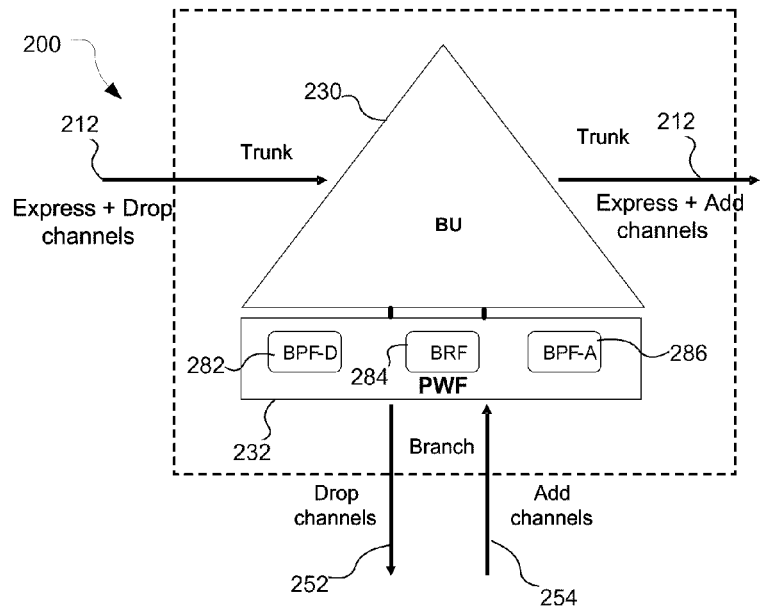
FIG. 2 is a schematic illustration of an embodiment of a branching configuration including a branching unit and separate predetermined wavelength filter (PWF) unit consistent with the present disclosure.

One exemplary embodiment of a branching configuration 200 consistent with the present disclosure is diagrammatically illustrated in FIG. 2. The illustrated exemplary embodiment of the branching configuration 200 includes a BU 230 coupled to trunk path 212 (e.g., optical fibers) and an associated PWF unit 232 coupled to, but physically separate from, the BU 230 and coupled to drop and add branch paths 252, 254 (e.g., optical fibers). The trunk path 112 may carry express channels and local channels, which are managed by the branching configuration 200. As shown, express channels pass through the branching configuration 200 from one trunk terminal to a receiving trunk terminal. One or more local channels (also referred to as drop channels) may pass through the branching configuration 200 from trunk path 212 to drop branch path 252. One or more local channels (also referred to as add channels) may pass through the branching configuration 200 from add branch path 254 to trunk path 212.

The adding and dropping of the local channel wavelengths is generally referred to as optical add drop multiplexing (OADM). To implement OADM in the branching configuration 200, for example, the branching configuration 200 may implement the following functions: splitting, filtering and combining. The splitting function involves splitting optical power on one input fiber into two or more outgoing fibers. An optical coupler is one example of a device that can implement the splitting function. The filtering function involves blocking at least a portion of an input optical spectrum (i.e., one or more wavelengths) from one or more outgoing fibers while allowing other wavelengths to pass. Optical filters that transmit some wavelengths and block one or more specific wavelengths can be implemented using technologies such as thin film optical filters and fiber Bragg gratings. The filtering function may also involve filtering using filter configurations that do not discriminate by optical wavelength such as an attenuator and an all-pass filter. The combining function involves merging optical signals from two or more sources onto a single output fiber. An optical coupler is one example of a device that can implement the combining function.

The OADM functionality at the undersea branching configurations referenced in this disclosure may be implemented using optical devices of fixed optical characteristics. The OADM functionality may also be implemented using optical devices for which the optical coupling and/or optical filtering characteristics may be changed or controlled in an installed branching configuration using local or remote control signals to the devices. In one example, an undersea system operator may transmit a control command to the BU and/or PWF unit as an optical signal transmitted through the optical fibers in the undersea system cables. Examples of controllable optical devices that may be used to provide OADM functionality include, without limitation, optical switches, tunable optical filters, variable optical attenuators, wavelength selective switches, and reconfigurable optical add drop multiplexers (ROADMs).

The branching configuration 200 may be implemented with any subset of the required splitting and combining functions implemented in the BU 230 with the remainder of the splitting and combining functions implemented in the PWF unit 232. Although some filtering functions may be implemented within the BU 230, the filtering functions specific to the OADM wavelength allocation process are implemented in the PWF unit 232. In the illustrated exemplary embodiment, the PWF unit 232 includes a drop band pass filter (BPF-D) 282 for passing that portion of the total optical spectrum of the trunk path required by the branch path, an add band pass filter (BPF-A) 286 for passing that portion of the branch path optical spectrum to be added to the trunk path, and a band reject filter (BRF) 284 for rejecting or blocking trunk path channel wavelengths to be reused when channel wavelengths are added.

Figure 3:
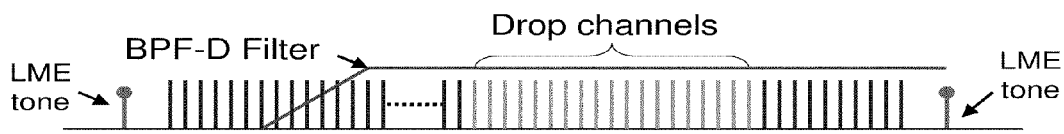
FIG. 3 illustrates an exemplary transmittance characteristic for a drop band pass filter useful in connection with a branching configuration consistent with the present disclosure.

FIG. 3 diagrammatically illustrates the transmittance vs. wavelength for an exemplary drop band pass filter (BPF-D) consistent with the present disclosure. The drop band pass filter is a band pass filter that restricts the range of the optical spectrum entering the drop branch path but passes at least the one or more wavelengths corresponding to the one or more local channels being dropped (i.e., drop channels). The drop band pass filter may also pass a line monitoring equipment (LME) tone, thereby enabling selective and unambiguous optical time domain reflectometry (OTDR) monitoring of the trunk and branch paths from the terminals. Because the optical amplifiers in the branch repeaters are nominally constant output power and because the total output power is shared among the channels propagating through the branch repeaters, the drop band pass filter may also pass to the drop branch path other channels in addition to the drop channels as necessary to support optical power management in the channels terminating at the branch station.

Figure 4:
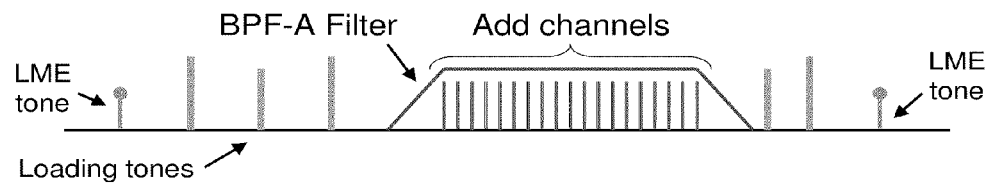
FIG. 4 illustrates an exemplary transmittance characteristic for an add band pass filter useful in connection with a branching configuration consistent with the present disclosure.

FIG. 4 diagrammatically illustrates the transmittance vs. wavelength for an exemplary add band pass filter (BPF-A) consistent with the present disclosure. The add band pass filter is a band pass filter that restricts the range of the optical spectrum such that only one or more wavelengths corresponding to the one or more channels being added (i.e., add channels) are allowed to pass from the add branch path to the trunk path. All other wavelengths may be blocked by the add band pass filter. The add band pass filter may thus ensure that loading signals, e.g. noise or loading tones, used on the branch path for optical power management do not reach the trunk path, where they could degrade channels on the trunk path. The add band pass filter may also prevent branch LME tones from being passed to the trunk path.

Figure 5:
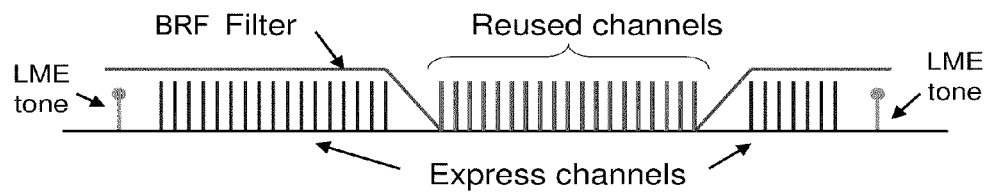
FIG. 5 illustrates an exemplary transmittance characteristic for a band reject filter useful in connection with a branching configuration consistent with the present disclosure.

FIG. 5 diagrammatically illustrates the transmittance vs. wavelength for an exemplary band reject filter (BRF) consistent with the present disclosure. The band reject filter blocks or removes one or more channel wavelengths on the trunk path in that portion of the bandwidth where the add channels are to be inserted, thereby enabling one or more existing wavelengths on the trunk path to be reused for the add channels. The portion of the bandwidth that is removed for the add channels may be the same portion of the bandwidth occupied by the drop channels. Thus, the same wavelengths used for the drop channels being dropped at a branching configuration may be made available to receive the add channels from that branching configuration.

Figure 6:
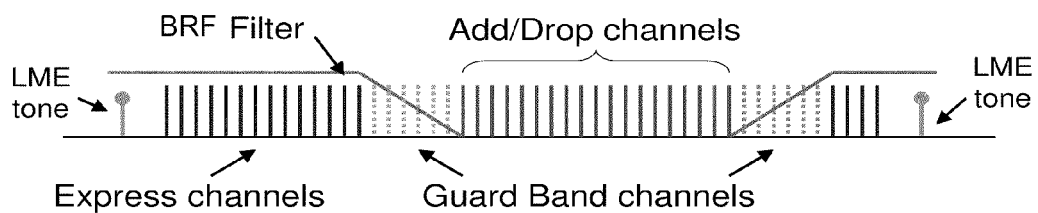
FIG. 6 illustrates an exemplary transmittance characteristic for a band reject filter useful in connection with a branching configuration consistent with the present disclosure and showing associated guard bands.

To provide differentiation between channels the BRF passes versus channels the BRF blocks, guard bands (i.e., restricted zones where no active channels are allowed) may be defined at the edges of the filter bands. The guard bands may provide suppression of channel cross-talk at the branching configuration. In one embodiment, each guard band may be 150-200 GHz wide. The number of channels that a guard band consumes depends on the guard band width and the channel spacing. FIG. 6 diagrammatically illustrates the transmittance vs. wavelength for an exemplary band reject filter (BRF) consistent with the present disclosure showing exemplary guard bands.

Figure 7:
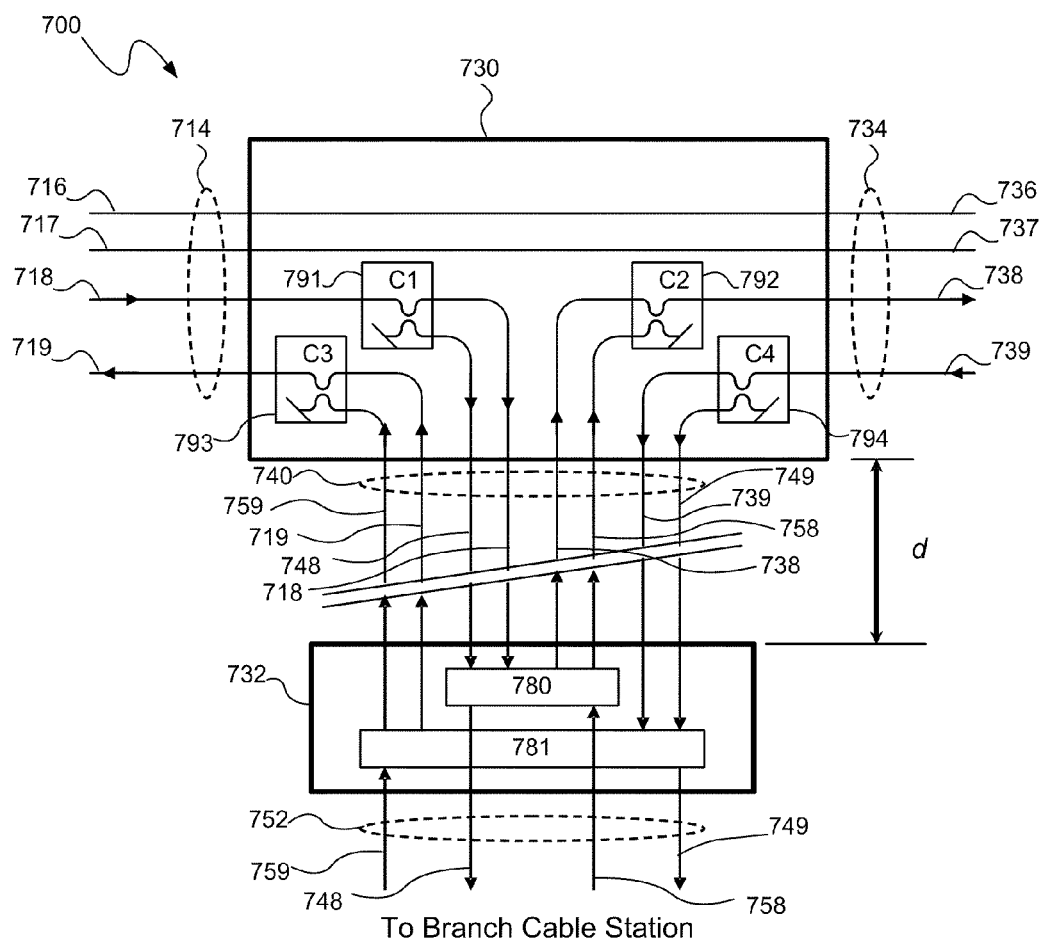
FIG. 7 is a schematic illustration of an embodiment of a branching configuration, consistent with the present disclosure, with the branching unit including add/drop couplers for performing OADM splitting and combining functions and the separate PWF unit including add/drop filter sets.

As discussed above, a branching configuration consistent with the present disclosure may be implemented with any subset of the splitting and combining functions implemented in the BU and with the remainder of the splitting and combining functions implemented in the associated PWF unit. FIG. 7 illustrates one exemplary embodiment of a branching configuration 700, consistent with the present disclosure, wherein OADM splitting and combining functions are contained within a BU 730 and OADM filtering functions are implemented in a PWF unit 732. In the illustrated exemplary embodiment, trunk cables 714, 734 terminate on the BU 730 with 2 fiber pairs (4 fibers) in each cable forming trunk paths that provide bi-directional communication. Pass-through trunk fibers 716, 717, 736, 737 provide direct trunk paths through the BU 730, which carry express channels in each direction. OADM trunk fibers 718, 719, 738, 739 are coupled to the PWF unit 732 to provide the OADM functionality and may carry both express channels and local channels.

Inbound OADM trunk fibers 718, 739 may be coupled to drop branch fibers 748, 749 to drop channels from each direction and outbound OADM trunk fibers 719, 738 may be coupled to add branch fibers 759, 758 respectively to add channels in each direction. In this embodiment, the BU 730 includes couplers 791-794 for splitting and combining the channels to/from the trunk fibers 718, 719, 738, 739, as shown. Although the OADM trunk fibers 718, 719, 738, 739 are coupled to the branch fibers 748, 749, 758, 759 in the BU 730, the OADM trunk fibers 718, 719, 738, 739 also pass to the PWF unit 732 to provide the wavelength reuse filtering for wavelength allocation. Branch cable segments 740, 752 including the OADM trunk fibers 718, 719, 738, 739 and/or the branch fibers 748, 749, 758, 759 are coupled to the BU 730 and the PWF unit 732.

The PWF unit 732 includes add/drop filter sets 780, 781 for filtering the trunk and branch signals as described above. In the exemplary embodiment, one add/drop filter set 780 filters the trunk and branch signals to provide wavelength allocation for one direction of communication through the branching configuration 700 and the other add/drop filter set 781 filters the trunk and branch signals to provide wavelength allocation for the other direction through the branching configuration 700. The add/drop filter sets 780, 781 may include combinations of the BPF-A, BPF-D and BRF filters described above, for performing a predetermined desired wavelength allocation.

Figure 7A:
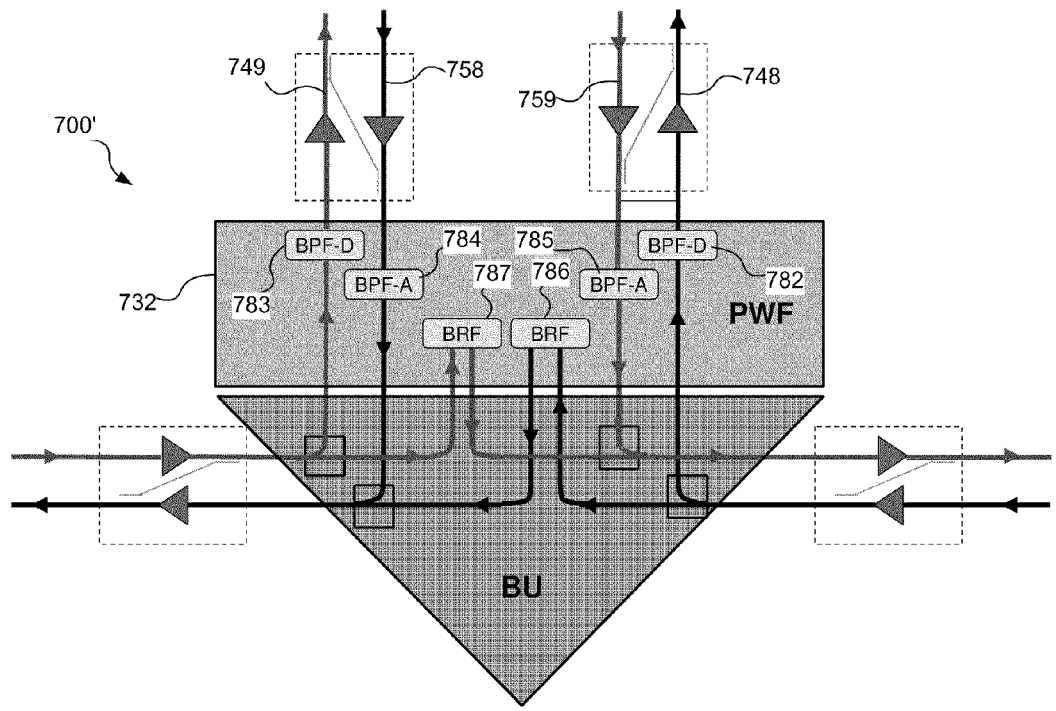
FIG. 7A is a schematic illustration of an exemplary embodiment of the branching configuration, consistent with the present disclosure, with the branching unit including add/drop couplers and the separate PWF unit including an exemplary arrangement of filters.

FIG. 7A illustrates a branching configuration 700' with an exemplary combination of BPF-A, BPF-D and BRF filters for performing a desired wavelength allocation in the PWF unit 732. In this exemplary combination, band pass filters 782, 784 and band reject filter 786 provide filtering for one direction of optical communication and band pass filters 783, 785 and band reject filter 787 provide filtering for the other direction of optical communication. The drop band pass filters 782, 783 are coupled to the drop branch paths or fibers 748, 749 to pass the dropped channel wavelengths to the drop branch fibers 748, 749. The add band pass filters 784, 785 are coupled to add branch fibers 758, 759 to pass the added channel wavelengths to be coupled to outbound trunk paths. The band reject filters 786, 787 are coupled to the trunk paths before the add couplers that couple the added channel wavelengths to the trunk path. It is to be understood, however, that any configuration of filters may be provided to achieve a desired wavelength allocation.

Figure 8:
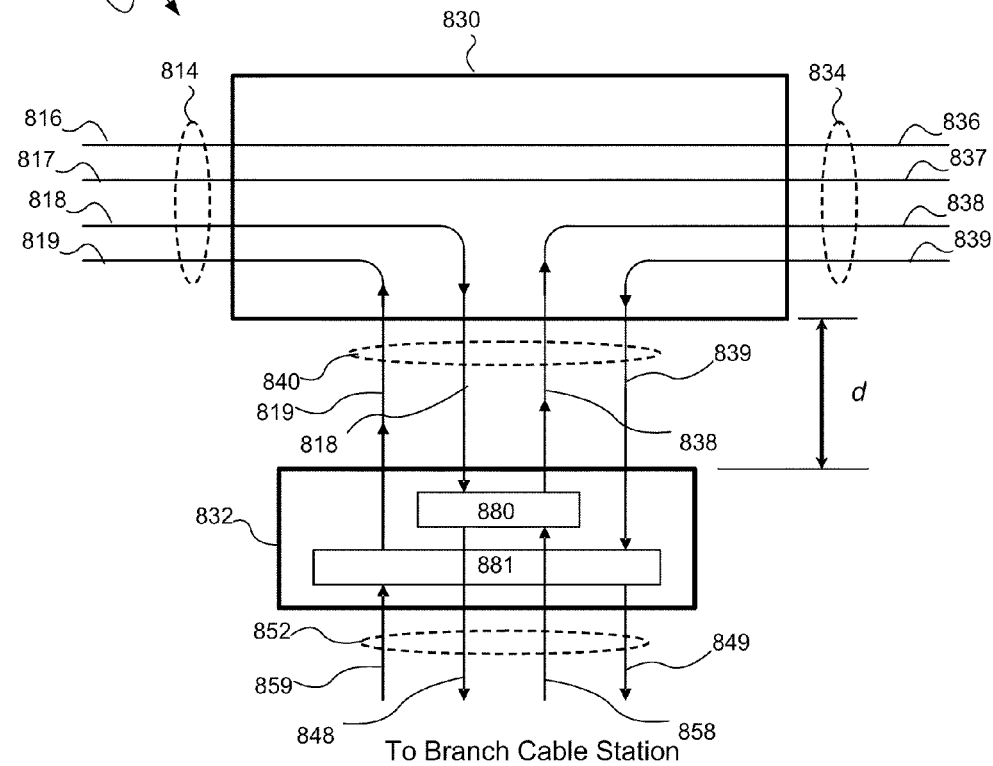
FIG. 8 is a schematic illustration of an embodiment of a branching configuration, consistent with the present disclosure, with a separate PWF unit including add/drop couplers and filter sets.

FIG. 8 illustrates one exemplary embodiment of a branching configuration 800, consistent with the present disclosure, wherein the OADM splitting and combining functions and the OADM filtering functions are contained within an associated PWF unit 832 coupled to and separate from a BU 830. In the illustrated exemplary embodiment, trunk cables 814, 834 terminate on the BU 830 with 2 fiber pairs (4 fibers) in each cable forming trunk paths that provide bi-directional communication. Pass-through trunk fibers 816, 817, 836, 837 provide direct trunk paths through the BU 830, which carry express channels in each direction. OADM trunk fibers 818, 819, 838, 839 are coupled to the PWF unit 832 to provide the OADM functionality and may carry both express channels and local channels.

In this embodiment, the PWF unit 832 includes add/drop coupler and filter sets 880, 881, which may include couplers for performing the splitting and combining functions and combinations of the BPF-A, BPF-D and BRF filters described above for performing a predetermined desired wavelength allocation. In the exemplary embodiment, one add/drop filter set 880 provides coupling and filtering for one direction of communication through the branching configuration 800 and the other add/drop filter set 881 provides coupling and filtering for the other direction through the branching configuration 800. Thus, the OADM trunk fibers 818, 819, 838, 839 are coupled to add and drop branch fibers 848, 849, 858, 859 in the PWF unit 832 using the add/drop coupler and filter sets 880, 881. Branch cable segments 840, 852 including the OADM trunk fibers 818, 819, 838, 739 and the branch fibers 848, 849, 858, 859, respectively, are coupled to the BU 830 and the PWF unit 832.

Figure 9:
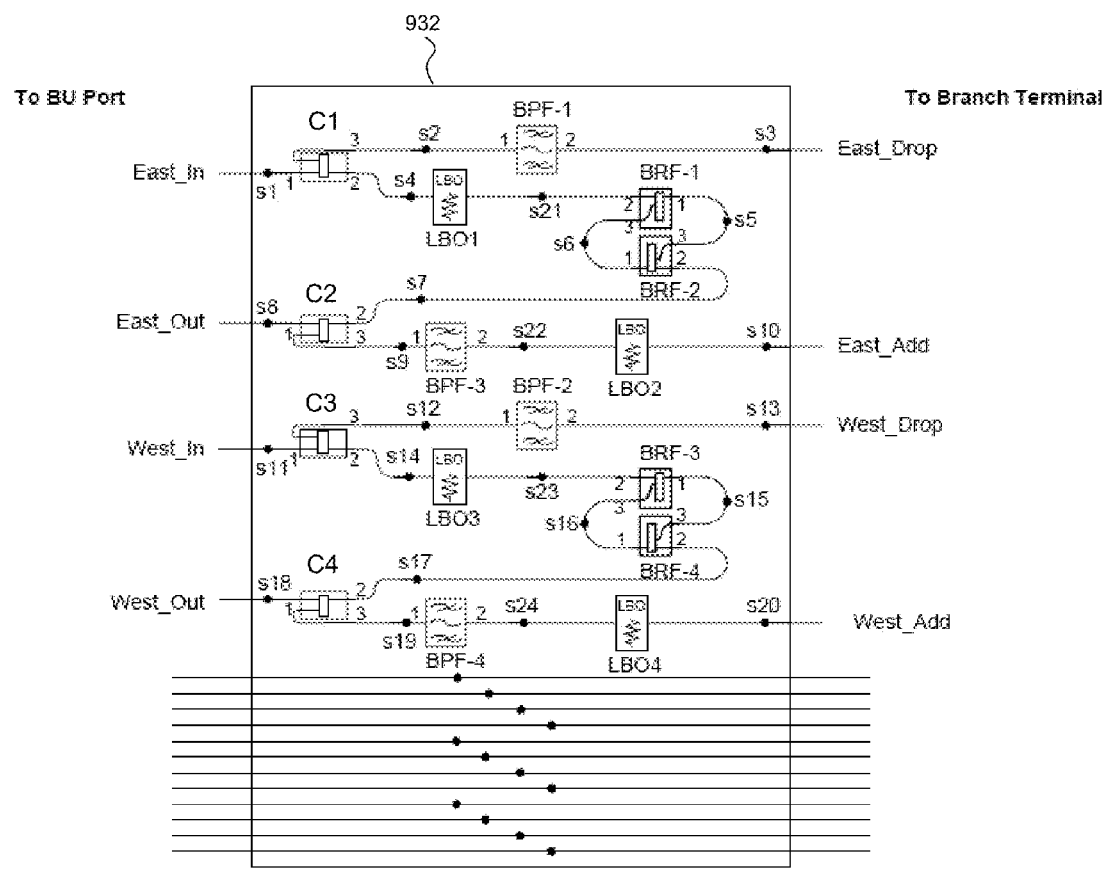
FIG. 9 is a schematic illustration of an embodiment of a PWF unit, consistent with the present disclosure, including an exemplary arrangement of add/drop couplers and filters.

FIG. 9 is an exemplary embodiment of a PWF unit 932 useful in connection with a bi-directional branching configuration, consistent with the present disclosure, and including both the OADM splitting and combining functions and the OADM filtering functions. The illustrated exemplary embodiment of the PWF unit 932 includes couplers (C1, C2, C3 and C4) in the PWF unit for splitting and combining channels to/from a BU. One set of couplers (C1, C2) splits and combines channels for eastbound communications to/from the BU and another set of couplers (C3, C4) splits and combines channels for westbound communications to/from the BU.

The illustrated exemplary embodiment of the PWF unit 932 further includes a set of filters (BPF-1, BPF-3, BRF-1, BRF-2) for performing a predetermined desired wavelength allocation for eastbound communication and a set of filters (BPF-2, BPF-4, BRF-3, BRF-4) for performing a predetermined desired wavelength allocation for westbound communication. The filter sets may include band pass filters (BPF-1, BPF-2, BPF-3, BPF-4) that allow the dropped or added channel wavelengths to pass, as described above. The filter sets may also include band reject filters (BRF-1, BRF-2, BRF-3, BRF-4), such as 3-port band reject filters, which block wavelengths corresponding to the channel wavelengths being added to allow channel wavelengths to be reused, as described above. The PWF unit 932 may also include splinted splices (e.g., S1-S20) to splice inbound and outbound trunk fibers and branch add and drop fibers to the fibers within the PWF unit 932 and to splice pass-through fibers in the PWF unit 932. The PWF unit 932 may further include line build out optical attenuators (LBO1-LBO4).

Figure 10:
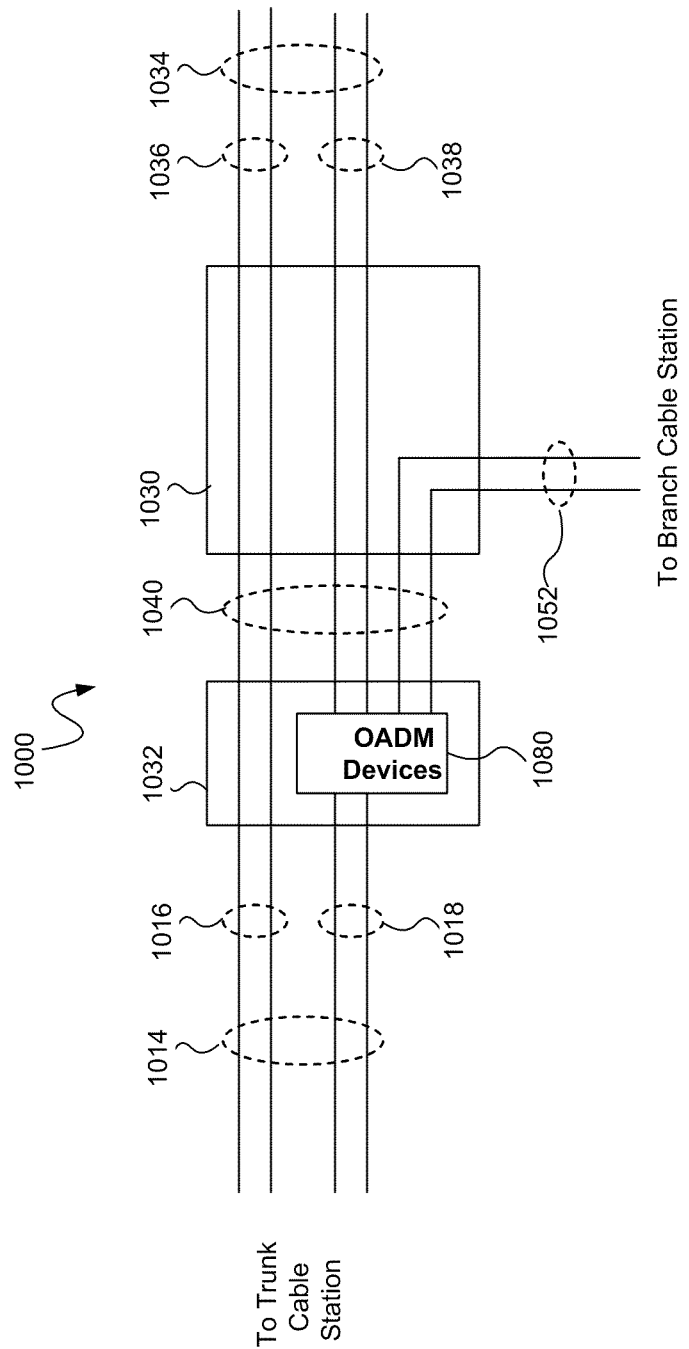
FIG. 10 is a schematic illustration of an embodiment of a branching configuration, consistent with the present disclosure, with a separate PWF unit coupled to a trunk cable.

As shown in FIG. 10, another exemplary embodiment of an undersea optical branching configuration 1000 includes a branching unit 1030 and a separate PWF unit 1032 coupled between the branching unit 1030 and a trunk terminal (e.g., cable station). The branching configuration 1000 is coupled to first and second trunk cables 1014, 1034 and includes a length of interconnecting trunk cable 1040 coupling the branching unit 1030 to the PWF unit 1032 and providing the physical separation. As discussed above, the branching unit 1030 and the PWF unit 1032 may be separated by either a short interconnecting cable 1040 if the system operation anticipates lifting the PWF unit and the branching unit together for marine operations, or by a long cable 1040 (e.g., much greater than the depth of deployment of the branching unit) if the PWF unit and branching unit are to be deployed or recovered without having both units in suspension at the same time.

In the illustrated embodiment, the first and second trunk cables 1014, 1034 each include first and second fiber pairs 1016, 1018, 1036, 1038. The first fiber pair 1016, 1036 in the respective first and second cables 1014, 1034 may implement a direct optical connection through the branching configuration 1000 and bidirectional optical communication between first and second trunk terminals or cable stations (not shown). The second fiber pair 1018, 1038 in the respective first and second cables 1014, 1034 implements OADM connections through the branching configuration 1000 and to a branch fiber pair 1052 and a branch terminal or cable station (not shown). The PWF unit 1032 includes OADM devices that implement optical coupling and optical filtering (e.g., as described above) for adding and dropping channels between the trunk OADM fiber pairs 1018, 1038 and the branch fiber pair 1052. Thus, optical signals to and from the branch cable station may be transmitted between the branch fiber pair 1052 and the PWF unit 1032 on the trunk cable 1014 through direct optical connection through the branching unit 1030 and interconnecting cable 1040 and the OADM devices 1080 in the PWF unit 1032.

This is only one example of a branching configuration for implementing OADM connections between a trunk fiber pair and a branch fiber pair using a PWF unit assembled into a trunk cable. In other embodiments, the system and OADM connections may be implemented without the direct connection fiber pairs 1016, 1036. Other embodiments may also support OADM connections to more than one trunk fiber pair and/or more than one branch fiber pair. Also, the PWF unit may be placed in the trunk cable connecting to either the first trunk cable station or in the trunk cable connecting to the second trunk cable station.

According to one method of use, a WDM optical communication system, consistent with the present disclosure, may be constructed and deployed initially without one or more of the PWF units to allow for future upgrades. Because a branching configuration consistent with the present disclosure allows for use of common branching units, options for future upgrades to an OADM architecture can be facilitated by using a stubbed BU in the initial system deployment. In such a configuration, a BU is installed in the trunk path but the branch path is terminated at an end seal, e.g. at a distance of two water depths from the BU. All fiber paths used to implement a connection to a future branch terminal through the branching configuration are extended through the BU to the end seal of the stubbed branch cable.

To perform an upgrade, the end of the branch cable stub can be recovered without lifting the BU from the ocean floor and the cable segments can be connected to complete the paths from the BU to the new branch terminal. If a filter-based OADM architecture is to be implemented, as described above, a PWF unit providing the desired wavelength allocation can be installed at the time the new branch is being configured. If a broadband OADM architecture is to be implemented, the new branch may be configured without adding a PWF unit.

According to another method of use, a WDM optical communication system, consistent with the present disclosure, may be reconfigured to change the wavelength allocation at one or more branching configurations. An existing PWF unit may be recovered, for example, and replaced with another PWF unit that provides the desired reconfigured wavelength allocation.

Accordingly, the branching configuration, consistent with the present disclosure, provides a separate unit for performing OADM functionality, which facilitates the design, deployment and upgrade of a branched WDM optical system with a desired allocation of channel wavelengths to be added and dropped. The branching configuration may also improve the reliability and security of the optical system by avoiding OADM functionality in a branch terminal.

Consistent with one embodiment, a wavelength division multiplexed (WDM) optical system includes at least one trunk terminal configured to provide a trunk signal on a trunk path, the trunk signal occupying a plurality of channel wavelengths, and at least one branch terminal configured to provide a branch signal on a branch path, the branch signal occupying at least one channel wavelength. The WDM optical system also includes at least one branching configuration located in an undersea environment and coupled to the trunk path and the branch path for receiving the trunk signal and the branch signal and for adding and dropping channel wavelengths to and from the trunk path. The branching configuration includes a branching unit and a predetermined wavelength filter (PWF) unit coupled between the branching unit and the branch terminal. The PWF unit is physically separated from the branching unit and the branch terminal and includes at least one filter configured to selectively filter the branch signal or the trunk signal for adding or dropping channel wavelengths.

Consistent with another embodiment, an undersea optical communication branching configuration includes a branching unit located in an undersea environment. The branching unit is coupled to a trunk path for receiving a trunk signal and coupled to a branch path for receiving a branch signal. The trunk signal occupies a plurality of channel wavelengths, and the branch signal occupies at least a one channel wavelength. A predetermined wavelength filter (PWF) unit is coupled to the branching unit on the branch path. The PWF unit is physically separate from the branching unit and a branch terminal. The PWF unit includes at least one filter configured to selectively filter the branch signal or the trunk signal for adding or dropping channel wavelengths.

Consistent with a further embodiment, a method is provided for deploying a branched WDM optical system. The method includes: coupling at least one trunk terminal to a trunk path, the trunk terminal being configured to provide a trunk signal on the trunk path, the trunk signal occupying a plurality of channel wavelengths; coupling at least one branching unit and stubbed branch path segment to the trunk cable; deploying the trunk path, the branching unit, and the stubbed branch path segment in an undersea environment; recovering the stubbed branch path segment from the undersea environment; coupling a PWF unit and an additional branch path segment to the stubbed branch path segment, the PWF unit comprising at least one filter configured to selectively filter trunk and/or branch signals for adding and/or dropping channel wavelengths; coupling a branch terminal to the additional branch path segment; and deploying the PWF unit and additional branch path segment in the undersea environment.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A wavelength division multiplexed (WDM) optical system comprising:
    at least one trunk terminal configured to provide a trunk signal on a trunk path, the trunk signal occupying a plurality of channel wavelengths;
    at least one branch terminal configured to provide a branch signal on a branch path, the branch signal occupying at least one channel wavelength; and
    at least one branching configuration located in an undersea environment and coupled to the trunk path and the branch path for receiving the trunk signal and the branch signal and for adding add channel wavelengths and dropping drop channel wavelengths to and from the trunk path, the at least one branching configuration comprising:
        a branching unit for coupling signals to and from the trunk path, the branching unit comprising at least a first coupler for splitting the trunk signal from the trunk path to the branch path and at least a second coupler for combining the branch signal from the branch path with the trunk signal on the trunk path; and
        a predetermined wavelength filter (PWF) unit coupled to the branching unit through a length of optical cable including a plurality of optical fibers for selectively filtering signals coupled to and from the trunk path, the PWF unit being physically separated from the branching unit and the at least one branch terminal and located at a distance between 30 meters and 50 kilometers from the branching unit, the PWF unit comprising at least one filter configured to selectively filter the branch signal or the trunk signal to add the add channel wavelengths from the at least one branch terminal to the trunk path or drop the drop channel wavelengths from the trunk path to the at least one branch terminal,
    wherein the at least one filter comprises at least a first filter configured to selectively filter the trunk signal to allow at least one of the plurality of channel wavelengths to pass for dropping from the trunk path to a drop branch path, at least a second filter to selectively filter the branch signal to allow the at least one channel wavelength to pass for adding from an add branch path to the trunk path, and at least a third filter configured to filter the trunk signal to block at least one channel wavelength corresponding to the at least one channel wavelength being added.

2. The WDM optical system according to claim 1, wherein the first and the second filters are band pass filters, and wherein the third filter is a band reject filter.

3. The WDM optical system according to claim 1, wherein the trunk path includes at least an inbound trunk fiber and an outbound trunk fiber, and wherein the branch path includes at least one drop fiber coupled to the inbound trunk fiber and at least one add fiber coupled to the outbound trunk fiber.

4. The WDM optical system according to claim 3, wherein the trunk path includes at least one pass-through trunk fiber passing through the branching unit without being coupled to the at least one add fiber or the at least one drop fiber.

5. The WDM optical system according to claim 1, wherein the plurality of channel wavelengths provide express channels and local channels, and wherein the PWF unit is configured to allow channel wavelengths for the express channels to pass through without being added or dropped, and wherein the PWF unit is configured to add and drop at least one of the plurality of channel wavelengths for at least one of the local channels.

6. The WDM optical system according to claim 1, wherein the PWF unit is located at least a distance from the branching unit that allows the PWF unit to be extracted from the undersea environment without extracting the branching unit from the undersea environment and without decoupling the PWF unit from the branching unit.

7. The WDM optical system according to claim 1, wherein the PWF unit is located a distance of 30-200 meters from the branching unit.

8. The WDM optical system according to claim 1, wherein the PWF unit is located a distance of 10-15 kilometers meters from the branching unit.

9. The WDM optical system according to claim 1, wherein the PWF unit is coupled to a branch cable segment between the at least one branch terminal and the branching unit.

10. The WDM optical system according to claim 1, wherein the PWF unit is coupled to a trunk cable segment between the at least one trunk terminal and the branching unit.

11. An undersea optical communication branching configuration comprising:
    a branching unit configured to be located in an undersea environment, the branching unit being coupled to a trunk path for receiving a trunk signal and being coupled to a branch path for receiving a branch signal, the trunk signal occupying a plurality of channel wavelengths, the branch signal occupying at least one channel wavelength, the branching unit comprising at least a first coupler for splitting the trunk signal from the trunk path to the branch path and at least a second coupler for combining the branch signal from the branch path with the trunk signal on the trunk path; and
    a predetermined wavelength filter (PWF) unit configured to be coupled to the branching unit through a length of optical cable including a plurality of optical fibers, the PWF unit being physically separated from the branching unit and a branch terminal and located at a distance between 30 meters and 50 kilometers from the branching unit, the PWF unit comprising at least one filter configured to selectively filter the branch signal or the trunk signal for adding add channel wavelengths from the branch terminal to the trunk path or for dropping drop channel wavelengths from the trunk path to the branch terminal, wherein the at least one filter comprises at least a first filter configured to selectively filter the trunk signal to allow at least one of the plurality of channel wavelengths to pass for dropping from the trunk path to a drop branch path, at least a second filter to selectively filter the branch signal to allow the at least one channel wavelength to pass for adding from an add branch path to the trunk path, and at least a third filter configured to filter the trunk signal to block at least one channel wavelength corresponding to the at least one channel wavelength being added.

12. A method of deploying a branched wavelength division multiplexed (WDM) optical system, the method comprising:
   coupling at least one trunk terminal to a trunk path, the at least one trunk terminal being configured to provide a trunk signal on the trunk path, the trunk signal occupying a plurality of channel wavelengths;
   coupling at least one branching unit and a stubbed branch path segment including a plurality of optical fibers to the trunk path;
   deploying the trunk path, the at least one branching unit, and the stubbed branch path segment in an undersea environment;
   recovering the stubbed branch path segment from the undersea environment;
   coupling a predetermined wavelength filter (PWF) unit and an additional branch path segment to the stubbed branch path segment at a distance between 30 meters and 50 kilometers from the at least one branching unit, the PWF unit comprising at least a first filter configured to selectively filter the trunk signal to allow at least one of the plurality of channel wavelengths to pass for dropping from the trunk path to a drop branch path, at least a second filter to selectively filter branch signal to allow at least one of the plurality channel wavelengths to pass for adding from an add branch path to the trunk path, and at least a third filter configured to filter the trunk signal to block at least one channel wavelength corresponding to the at least one channel wavelength being added;
   coupling branch terminal to the additional branch path segment; and deploying the PWF unit and the additional branch path segment in the undersea environment.

13. The method of claim 12, wherein the stubbed branch path segment is recovered without recovering the at least one branching unit.

* * * * *